(12) United States Patent
Raver

(10) Patent No.: US 8,015,792 B2
(45) Date of Patent: Sep. 13, 2011

(54) TIMING CONTROL SYSTEM FOR PULSE DETONATION ENGINES

(75) Inventor: Bernard J. Raver, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1172 days.

(21) Appl. No.: 11/651,188

(22) Filed: Jan. 8, 2007

(65) Prior Publication Data

US 2010/0229529 A1 Sep. 16, 2010

(51) Int. Cl.
*F02C 5/02* (2006.01)
(52) U.S. Cl. .......................... 60/39.4; 60/39.38; 60/247
(58) Field of Classification Search ................ 60/39.38, 60/39.39, 247, 39.9, 39.4
See application file for complete search history.

(56) References Cited

U.S. PATENT DOCUMENTS

| | | | |
|---|---|---|---|
| 4,651,241 A | | 3/1987 | von der Heide et al. |
| 5,559,705 A | * | 9/1996 | McClish et al. ............... 701/110 |
| 5,901,550 A | * | 5/1999 | Bussing et al. ............... 60/39.38 |
| 2003/0056490 A1 | | 3/2003 | Anderson et al. |

FOREIGN PATENT DOCUMENTS

| | | |
|---|---|---|
| JP | 63-268938 A | 11/1988 |
| JP | 8-50151 A | 2/1996 |
| JP | 8-248048 A | 9/1996 |
| JP | 11-142448 A | 5/1999 |
| JP | 2003-149260 A | 5/2003 |

OTHER PUBLICATIONS

Japanese Office Action for JP Patent Application No. 2008-000948, dated Nov. 30, 2010.
European Search Report for EP Patent Application No. 08250045.5, dated May 10, 2011.

* cited by examiner

*Primary Examiner* — William H Rodríguez
*Assistant Examiner* — Phutthiwat Wongwian
(74) *Attorney, Agent, or Firm* — Backman & LaPointe, P.C.

(57) ABSTRACT

An engine timing input system is described for pulse detonation engines that allows for accurate engine timing when rotary or cylindrical valves are used to distribute an air/fuel mixture for combustion. The invention uses a profile disk having a predetermined circumferential edge corresponding to valve position to provide for accurate engine timing. A frequency wheel is used in conjunction with the profile disk to provide a more accurate representation of valve position by partitioning the valve position into multiple pulses during each rotation of the rotary or cylindrical valve. The profile disk and frequency wheel when used with programmable timing circuitry signal fuel valve timing and ignition relative to the rotating valve.

23 Claims, 7 Drawing Sheets

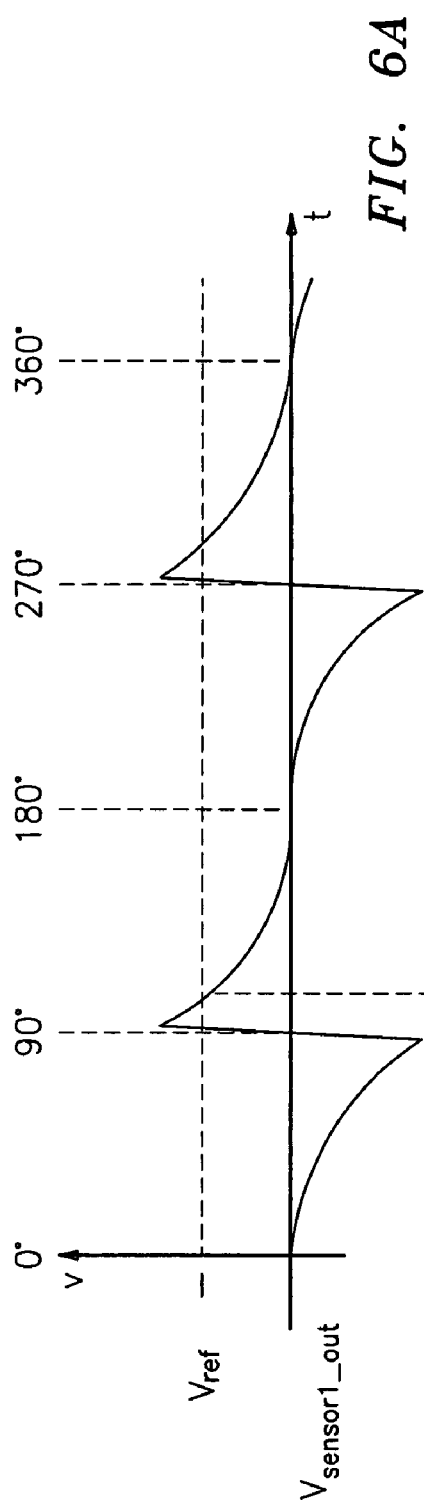
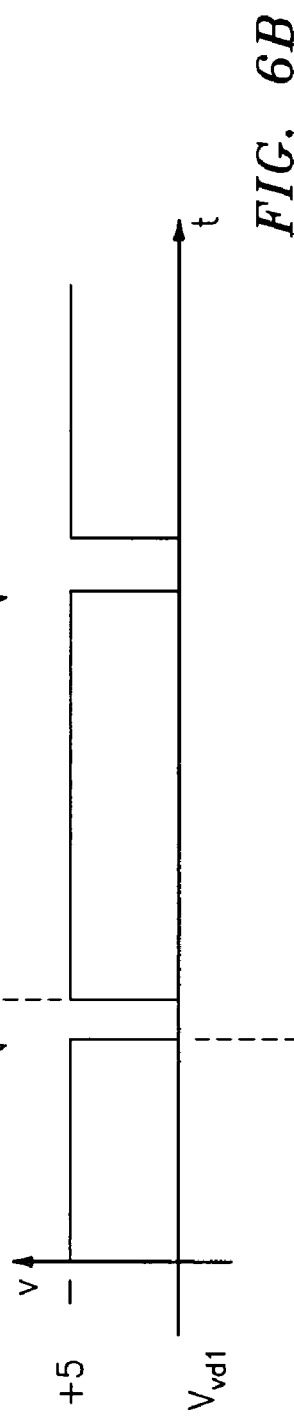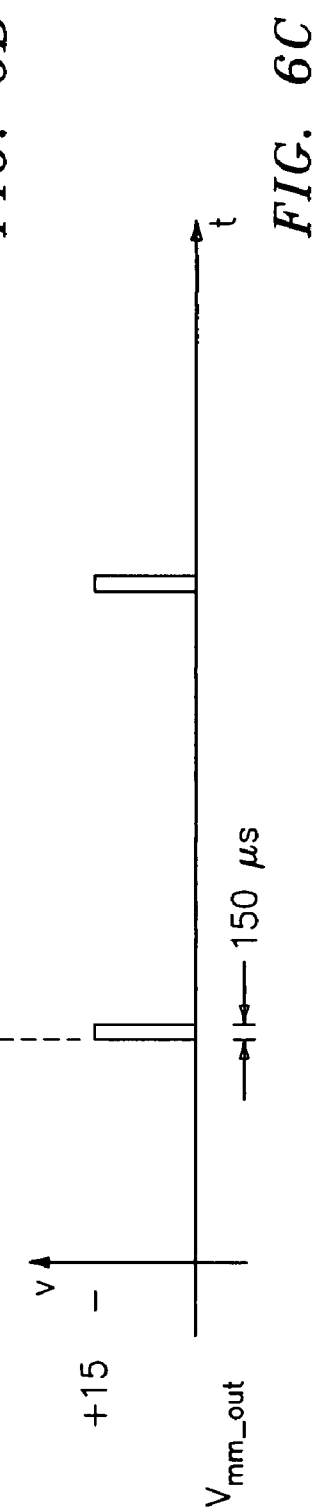
FIG. 6A
FIG. 6B
FIG. 6C

TIMING CONTROL SYSTEM FOR PULSE DETONATION ENGINES

BACKGROUND OF THE INVENTION

The invention relates generally to the field of intermittent combustion engines. More specifically, embodiments of the invention relate to system's for controlling detonation combustor timing input for pulse detonation engines.

A pulse detonation engine (PDE) is a type of intermittent combustion engine that is designed primarily to be used in high-speed, high-altitude environments. The PDE can achieve an efficiency far surpassing gas turbines with almost no moving parts.

Like other jet engines, the PDE takes in air at its front end. In a conventional jet engine, intake air would be driven by a fan through a multistage compressor and into a combustion section or burner where fuel would be burned continuously.

While the operating principle of a PDE is similar to a pulse jet engine, the fundamental difference of a PDE is that it detonates the air/fuel mixture. The pulse jet uses a series of shutters, or careful tuning of the inlet, to force the air to travel only in one direction through the engine to ensure that the mixture exits to the rear thereby pushing an aircraft forward. Another difference is the way in which airflow and combustion in the engine is controlled.

Typically, fuel is consumed either by deflagration, which is slow burning, or detonation, which is a more energetic process. Detonation is inherently more efficient than deflagration. The PDE combustion process burns all of its air/fuel mixture while still inside the engine at a constant volume. While the maximum energy efficiency of most types of jet engines is approximately 30%, a PDE can attain an efficiency near 50%.

All regular jet engines and most rocket engines operate on the rapid, but subsonic combustion of fuel. The PDE is a jet engine that operates on the supersonic detonation of fuel.

One attribute of deflagration is that the flame travels at a speed significantly lower than the speed of sound. However, detonation is a more powerful reaction of the air/fuel mixture and results in such a rapid reaction that the pressure wave created travels at supersonic speeds. Detonation is a violent explosion and produces higher pressures than the process of deflagration.

If a tube were closed at one end and filled with a mixture of air and fuel at the closed end and ignited by a spark, a combustion reaction would propagate down the tube. In deflagration, the reaction would move at tens of meters per second. In detonation, a supersonic shock wave travels the length of the tube at thousands of meters per second. Detonation compresses and ignites the air/fuel mixture almost instantaneously in a narrow, high-pressure heat-release zone.

To create a narrow, high-pressure heat-release zone, the engine must precisely coordinate fuel input, airflow and ignition to create a deflagration-to-detonation transition (DDT). DDT is the process by which an ordinary flame suddenly accelerates into a powerful detonation. While detonation generates more thrust than deflagration for the same fuel consumption, only tiny amounts of fuel can be detonated at a time. For a continuous thrust, many detonations per second are required. For example, the cycle rate of a pulse jet is typically 250 pulses per second. A PDE is thousands of pulses per second.

For a realizable PDE, an air/fuel flow is typically switched between a plurality of combustor tubes, where in each, the air/fuel mixture must detonate cleanly many times per second. The switching is performed using a rotary or cylindrical valve spinning at thousands of revolutions per minute having apertures which alternately open and block airflow to an inlet for each combustor.

A cycle is formed in which the valve admits fuel into a stream of air flowing into a combustor and a spark initiates a DDT producing a shock wave that travels the length of the combustor generating thrust.

PDE designs that use rotary valves to control detonation require a sophisticated synchronization system to ensure that the externally driven valve opens and closes each combustor to inject and detonate the charge at exactly the right moment to optimize detonation of the air/fuel mixture. Detonating the mixture either too early reduces combustion efficiency and if late, the mixture will leave the combustor tube.

The position of the rotary or cylindrical valve is important for the timing of air/fuel mixture and subsequent ignition. One misfire (fuel or ignition at an inappropriate time) can destroy the entire engine. It is therefore desired to have a ±0.5 degree of angular resolution accuracy for the valve when performing ignition timing.

SUMMARY OF THE INVENTION

Although there are various systems and methods that perform timing control for pulse detonation engines, such systems and methods are not completely satisfactory. The inventor has discovered that it would be desirable to have a system that allows for accurate engine timing when rotary or cylindrical valves are used to distribute an air/fuel mixture for combustion at either subsonic or supersonic speeds.

The invention uses a profile disk having a predetermined circumferential edge corresponding to valve position to provide for accurate engine timing. A frequency wheel is used in conjunction with the profile disk to provide a more accurate representation of valve position by partitioning the valve position into multiple pulses during each rotation of the rotary or cylindrical valve. The profile disk and frequency wheel when used with programmable timing circuitry signal fuel valve timing and ignition relative to the rotating air valve system. The control system may be slaved off of valve position.

Another aspect of the invention is an engine timing input system. Systems according to this aspect of the invention comprise a profile disk having a center and a circumferential edge, the profile disk center coupled to a rotating member of the engine wherein one revolution of the rotating member represents one engine cycle, and a sensor positioned in proximity to the profile disk edge wherein the sensor translates the circumferential edge into a signal for output.

Yet another aspect of the system is a signal conditioner coupled to the sensor output wherein the signal conditioner processes the sensor signal into a predefined pulse train.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6A is an exemplary plot of the profile disk position sensor output voltage $V_{sensor1\_out}$ over time.

FIG. 6B is an exemplary plot of the profile disk voltage divider output voltage $V_{vd1\_out}$ over time.

FIG. 6C is an exemplary plot of the multivibrator output voltage $V_{mm\_out}$ over time.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Embodiments of the invention provide systems for controlling jet engine timing based upon the position of a rotary or cylindrical air/fuel mixture inlet valve. The invention provides an engine timing input using a sensor and a profile disk as the primary element that coordinates cyclical engine function position with other functions. A frequency wheel provides for a more accurate representation of valve position by partitioning the valve position as indexed by the profile disk into multiple pulses for each engine cycle. An accuracy of at least ±0.5 degrees may be achieved. In one embodiment, the invention is deployed as an engine timing input system for a PDE.

Figure 1:
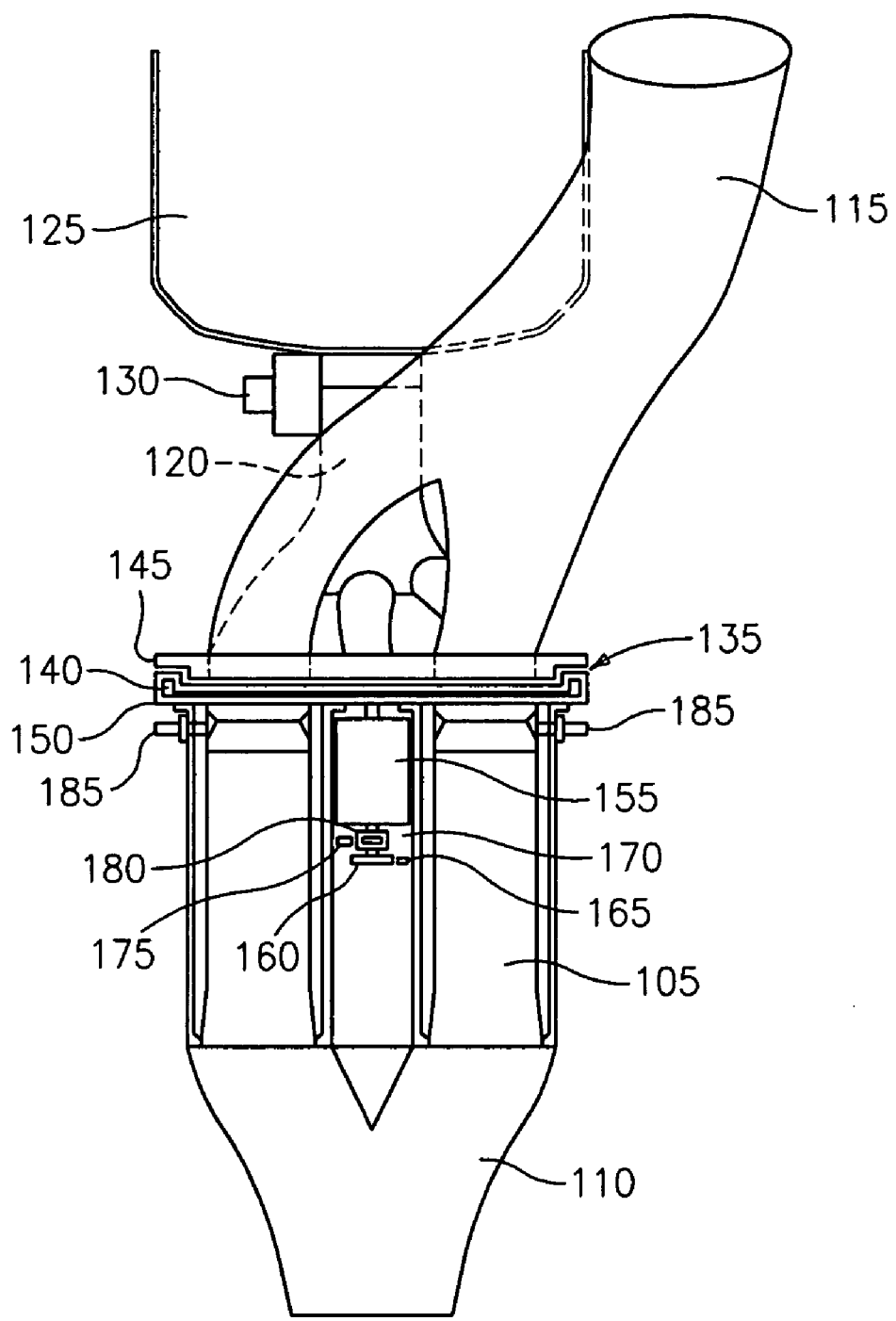
FIG. 1 is an exemplary cross-sectional view of a pulse detonation engine.

Shown in FIG. 1 is a cross-sectional view of an embodiment of a PDE to illustrate the timing control system of the invention. The PDE has at least one combustor (detonation chamber) 105 having an elongated tubular construction. If more than one combustor 105 is used, the lengths of the combustors 105 extend parallel to each other to produce thrust in the same direction, or the combustors may be combined or extended in different directions to produce a cumulative parallel thrust. A nozzle 110 may be employed at the outlet ends of the combustors 105 to unify thrust. The exemplary embodiment uses a cluster of four combustors 105.

The combustors 105 are fed an air/fuel mixture with air from an inlet air manifold 115 and fuel from a fuel manifold 120. The inlet for the air manifold 115 may be in the form of an inlet shock cone. The fuel manifold 120 delivers fuel from a fuel source 125 which can be controlled by a fuel valve 130. The PDE may use solid, liquid or gas fuel 125.

The combustors 105 are coupled to the inlet air 115 and fuel 120 manifolds by an intake manifold/rotary valve assembly 135. The intake manifold/rotary valve assembly 135 has a rotary disk valve 140 positioned between an intake manifold mounting plate 145 on an upper side of the intake manifold/rotary valve assembly 135 and a combustor mounting plate 150 on a lower side. The intake manifold mounting plate 145 is coupled to the inlet air 115 and fuel 120 manifolds. The combustor mounting plate 150 is coupled to the combustors 105.

The rotary disk valve 140 is rotatably mounted between the intake manifold mounting plate 145 and combustor mounting plate 150. The rotary disk valve 140 has at least one fueling aperture or port 200 as shown in FIG. 2A and is rotated by a drive motor 155.

A timing profile disk 160 is coupled via a key or spline to a common or auxiliary shaft of the drive motor 155. Mounted adjacent to the profile disk is a sensor 165 for translating the position of the profile disk 160. A frequency wheel 170 having a plurality of slots 180 located in its outer periphery is coupled similarly, via a key or spline to a common or auxiliary shaft of the drive motor 155. Mounted adjacent to the frequency wheel is a sensor 175.

The rotation of the valve disk 140 opens and closes passages between the intake manifold 145 and combustor 150 mounting plates. An igniter 185 positioned near an inlet end of each combustor 105 is used for ignition and may be, for example, an electrode, a spark plug, an arc gap, or other.

Figure 2A:
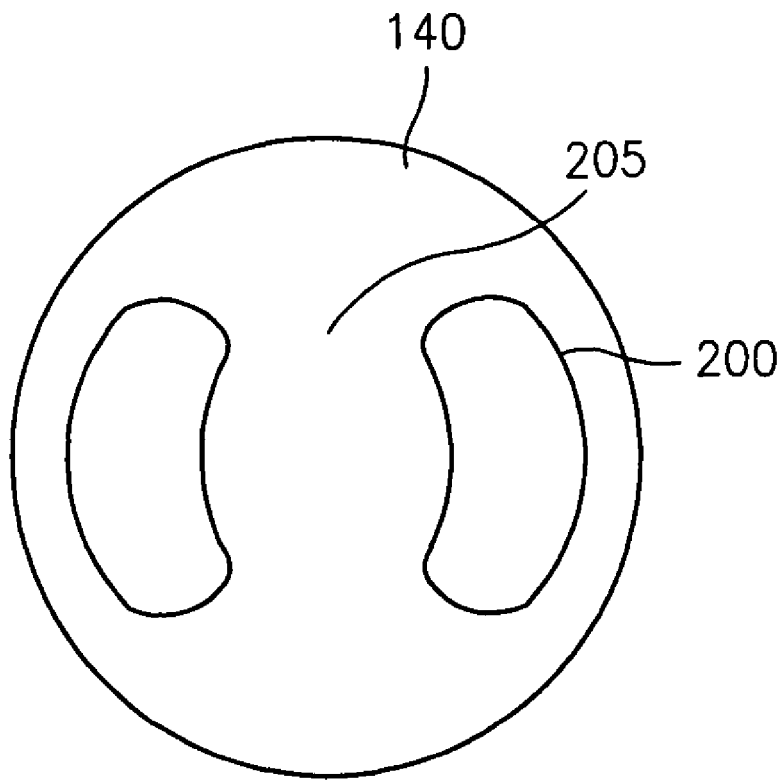
FIG. 2A is an exemplary top view of a rotary valve disk.
Figure 2B:
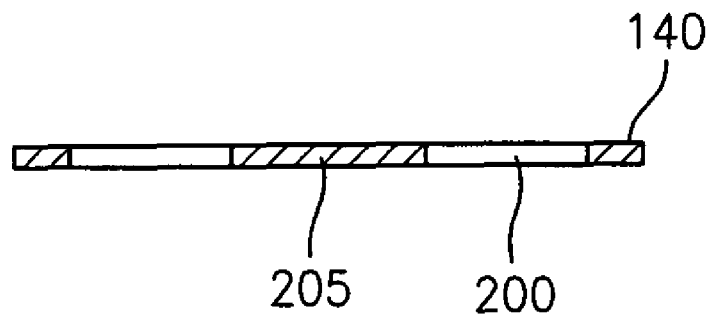
FIG. 2B is an exemplary side view of the rotary valve disk shown in FIG. 2A.

The rotary disk valve 140 has two fueling port openings 200 as shown in FIGS. 2A and 2B. However, the number of ports may vary depending on the number of combustors employed. The openings 200 are arranged circumferentially around the center of the rotary valve disk 140 such that as the disk valve 140 rotates, the openings 200 are selectively positioned above the inlet ends of the combustors 105 for fueling. The distance of the openings 200 from the center of the rotary disk valve 140 corresponds to the distance of the combustor 105 inlets from the central axis of the combustor cluster.

The apertures 200 are arcuate in shape, defined by inner and outer concentric edges. The distance between the inner and outer edges (aperture width) of the openings 200 may be in matching correspondence with the combustor 105 inlet openings.

Solid portions 205 are arranged between the openings 200 of the rotary disk valve 140. As the rotary disk valve 140 rotates, the openings 200 and solid portions 205 are alternately positioned above the combustor 105 inlets. Therefore, fueling of a combustor 105 occurs when an opening 200 is positioned over an inlet end. A combustor may be fired when a solid portion 205 is positioned over the same inlet end.

Figure 3A:
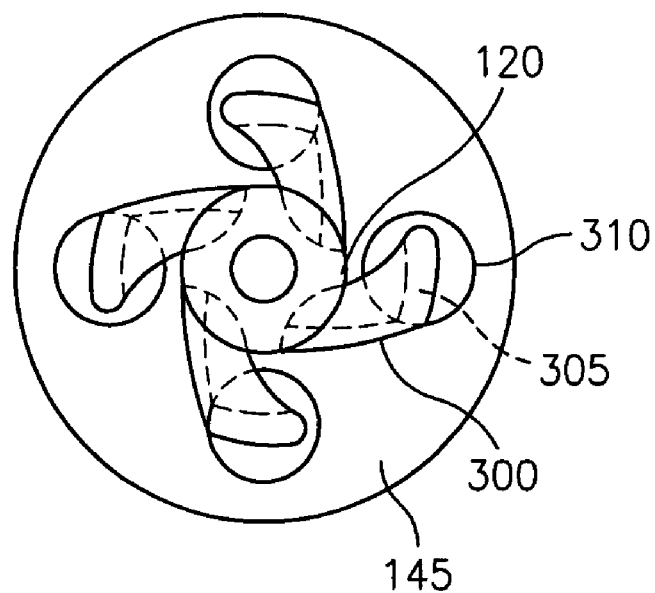
FIG. 3A is an exemplary top view of the fuel manifold inlets in relation to the rotary valve disk.
Figure 3B:
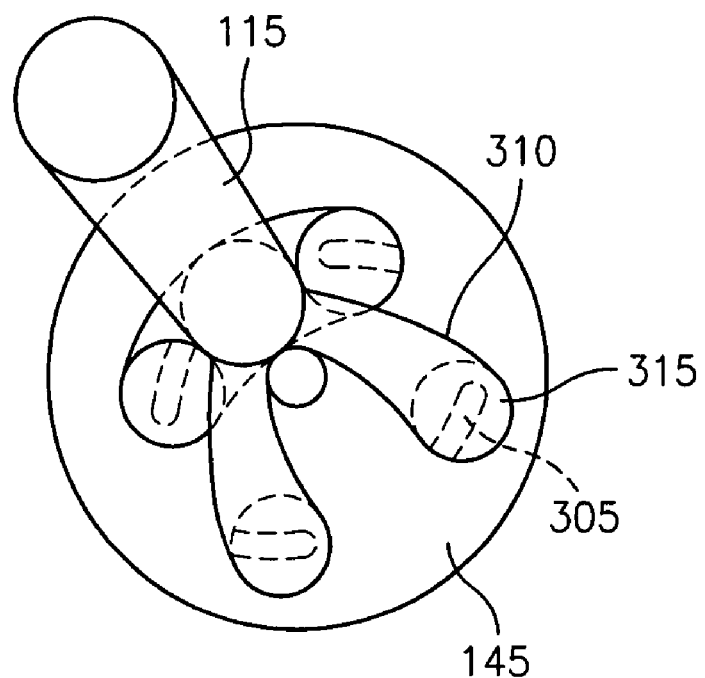
FIG. 3B is an exemplary top view of the air manifold inlets in relation to the rotary valve disk.

FIGS. 3A and 3B show top views of the fuel 120 and inlet air 115 manifolds, respectively. Fuel is distributed from the fuel source 125 to each combustor 105 through individual fuel ducts 300. Each individual fuel duct 300 has a finger-shaped cross-section and ends at a finger-shaped port 305 which opens into the corresponding combustor 105.

The individual fuel ducts 300 are arranged partially within individual air ducts 310 as shown in FIG. 3B. The individual air ducts 310 distribute air from the inlet air manifold 115 to the combustors 105. Each individual air duct 310 ends in a circular air port 315 which opens into the corresponding combustor 105. The finger-shaped fuel ports 305 (shown in phantom in FIG. 2B) are arranged within the air ports 315. It will be appreciated that this arrangement allows each combustor 105 to be topped off with air after it is fueled.

Having described the various components, the operation of the PDE of FIG. 1 is as follows. Fuel is distributed from the fuel source 125 in a steady mode, and air enters the inlet air duct manifold 115 also in a steady mode. Rotary valve drive motor 155 rotates the rotary disk valve 140 between the fuel/air manifold mounting plate 145 and the lower mounting plate 150.

In the fueling arrangement shown in FIGS. 3A and 3B, as an opening 200 of the rotary valve 140 moves into position over the inlet end of a combustor 105, air and fuel enter that combustor through the corresponding port 310, 305. As the rotary disk valve 140 continues to rotate, the trailing edge of the opening 200 closes off the finger-shaped fuel port 305, while air continues to enter the combustor 105 through a portion of the circular port 315 which remains open. The air/fuel mixture in the combustor 105 is topped off with air and any gaps that may exist in the system are filled with air. The air acts as an additional insulation buffer to protect the rotor assembly and prevent pre-ignition of neighboring combustors 105.

Upon detonation, pressure forces will act upon all inner surfaces of the combustors 105. The pressure differential from the inlet end to the outlet end of each combustor 105, acting upon the rotary valve 140, will contribute to the thrust of the vehicle. The combustors 105 may be tapered so that pressure along the lateral inner surfaces of the combustors will contribute to thrust. The transfer of the pressure forces from the rotary valve 140 to the vehicle structure occurs through the rotary valve bearings (not shown).

Engine thrust may be controlled by varying ignition timing, valve rotation rate and fuel injection rate, for example, using a processor in conjunction with an air/fuel ignition algorithm. The operation of a PDE may be controlled by software using a processor and inputs/outputs (I/O). Signals input from the profile disk 160 and frequency wheel 170 timing wheel may be connected to a sixteen bit counter/timer for generating output pulses.

While one or more combustors 105 are fired, another one or more combustors 105 are being fueled with an air/fuel mixture. For the four combustor 105 PDE shown in FIG. 1, combustors 1 and 3 may fire while combustors 2 and 4 are being fueled. As the rotary valve disk 140 seals one or more combustors 105 for detonation, it opens adjacent combustors 105 for recharging.

The detonation cycle of the PDE combustors 105 can be described according to the fundamental processes that occur within the combustors 105. The pulse detonation combustor cycle is comprised of several distinct processes: 1) the detonation chamber is charged with an air/fuel mixture, 2) the rotary valve 140 seals the fueled combustor 105 and detonation is initiated at the closed end, 3) a detonation wave travels through the combustor 105, 4) the detonation wave exits and burned gases are exhausted, and 5) the rotary valve 140 opens the combustor 105 and the combustor 105 is recharged while adjacent combustors 105 are detonated.

Figure 4:
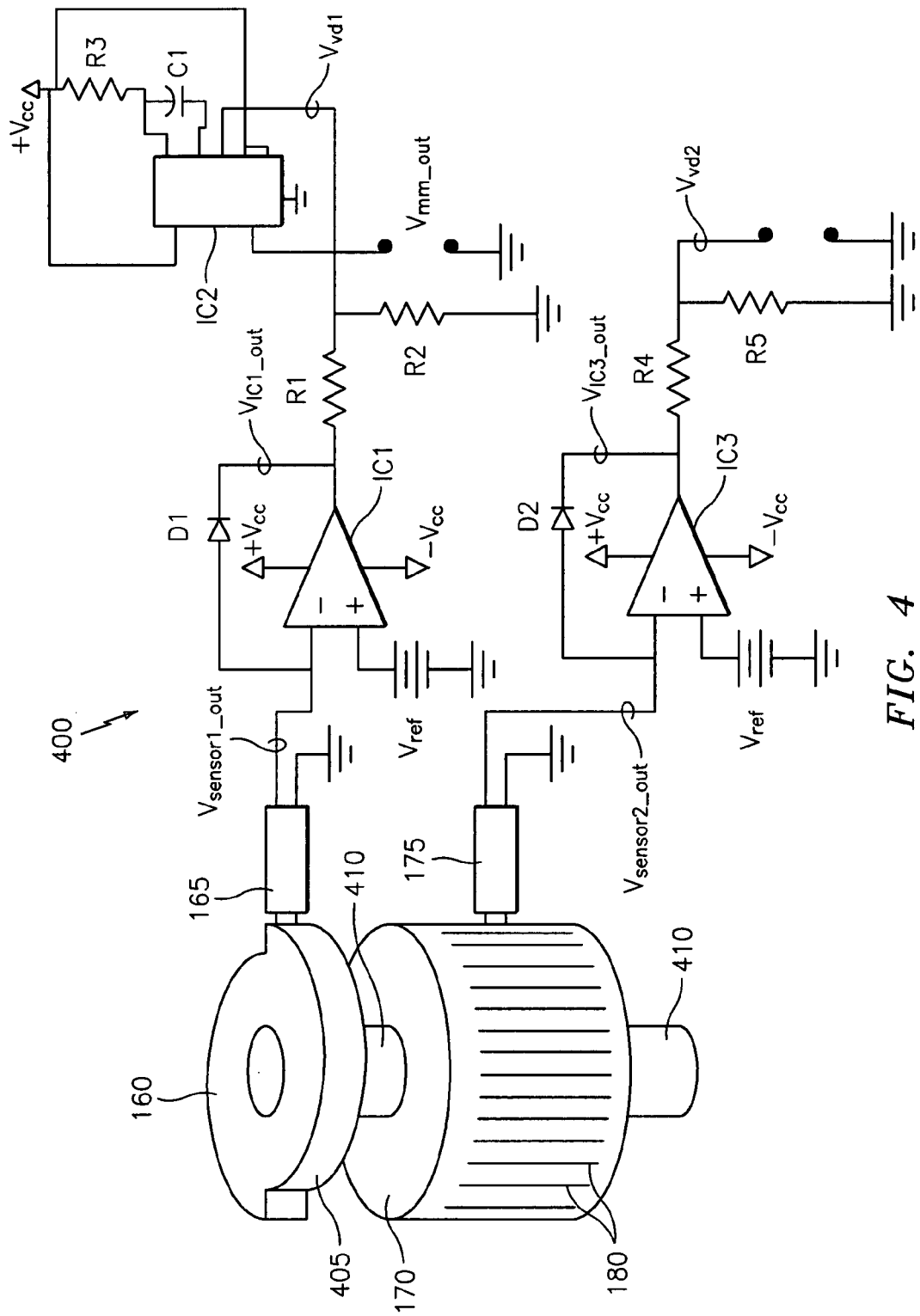
FIG. 4 is an exemplary schematic diagram of the engine timing input according to the invention.

Shown in FIG. 4 is the engine timing input system 400 of the invention. The timing input system 400 provides ignition and fuel timing for a PDE.

The timing input 400 comprises the profile timing disk 160 which has a predetermined circumferential edge profile 405 and a frequency wheel 170 having a plurality of slots 180 located in its outer periphery. The edge profile 405 has one or more elliptical cuts corresponding to the number of combustors 105 employed in a particular PDE design.

Figure 5:
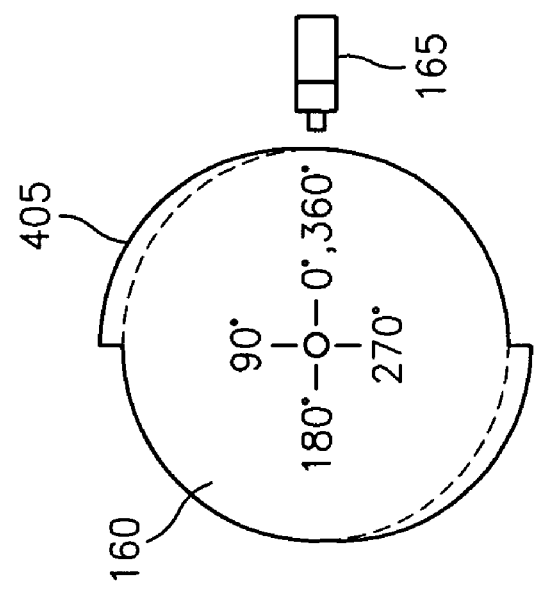
FIG. 5 is an exemplary top view of the profile disk.

The profile disk 160 embodiment shown in FIG. 5 has two elliptical cuts and may therefore be configured for a PDE design that has two combustors 105. The disk 160 may be coupled to the shaft of the rotary valve 140, the shaft 410 of the rotary valve 140 drive motor 155, or located on a geared or non-geared auxiliary shaft positioned away from the rotary valve 140 (not shown).

Located adjacent and in proximity to the edge of the profile disk 160 is the non-contact sensor 165. The sensor 165 may be a magnetic field sensor such as a Hall-effect device. The sensor 165 measures only one component of a magnetic field. The edge profile 405 is translated by the sensor 165 into an analog bipolar output voltage $V_{sensor1\_out}$.

The voltage magnitude of the sensor output signal $V_{sensor1\_out}$ follows the change in magnetic flux produced by the edge profile over time. The signal increases in amplitude as the angular velocity of the profile disk 160 increases. The sensor output $V_{sensor1\_out}$ is shown over time in FIG. 6A.

The timing input 400 produces a square wave pulse from the sharp rising edge of the analog signal which corresponds to a specific angular displacement of the rotary valve 140. The sensor 165 output $V_{sensor1\_out}$ coupled to an op amp (operational amplifier) IC1 such as a Motorola MC4741CL which is configured as a voltage comparator. The comparator is clamped with a diode $D_1$.

The comparator provides an output voltage $V_{IC1\_out}$ that equals 0 Vdc when the input voltage is greater than a predefined reference voltage $V_{ref}$. For this embodiment, $V_{ref}=0.354$ Vdc.

When the input voltage $V_{sensor1\_out}$ is Less than the reference voltage $V_{ref}$, the comparator outputs a saturation voltage $V_{IC1\_out}=+V_{sat}$. The operational amplifier is sourced with $\pm 15$ Vdc causing the saturation voltage $+V_{sat}$ to therefore be +15 Vdc. The comparator output waveform $V_{IC1\_out}$ is reduced to +5 Vdc using a voltage divider comprising resistors $R_1$ and $R_2$, $$V_{vd1} = \frac{V_{IC1\_out}(R_2 \| R_{load1})}{(R_1 + R_2 \| R_{load1})}, \quad (1)$$

where $V_{vd1}$ is the voltage measured across $R_2$ and $R_{load1}$. $R_{load1}$ is the input impedance of a coupled load. The values for $R_1$ and $R_2$ can be set at 35.6 k$\Omega$ and 17.8 k$\Omega$ respectively. The voltage divider output $V_{vd1}$ is shown over time in FIG. 6B.

The coupled load $R_{load1}$ is the input impedance of a monostable multivibrator IC2, more commonly known as a one shot, such as a 74C221 IC. The one shot IC2 conditions the voltage divider output $V_{vd1}$ into a pulse train having a predetermined amplitude and pulse width regardless of the rotary valve 140 velocity. The one shot IC2 triggers on a trailing or falling edge of the voltage divider output waveform $V_{vd1}$. A 150 μs pulse is generated by the one shot IC2. An external resistor $R_3$ and capacitor $C_1$ define the pulse width and amplitude. The values for the exemplary embodiment are 1.343 k$\Omega$ and 1.0 μF respectively. The one shot IC2 output $V_{mm\_out}$ is shown over time in FIG. 6C.

The one shot output $V_{mm\_out}$ is coupled to an engine management system for the PDE (not shown). The management system typically controls an ignition system of a high-tension design for producing a spark across a gap. For example, the one shot output $V_{mm\_out}$ may be coupled to a counter/timer digital input/output (I/O) board, such as a National Instruments PC-TIO-10. A discussion of the management system is beyond the scope of this disclosure.

Figure 7:
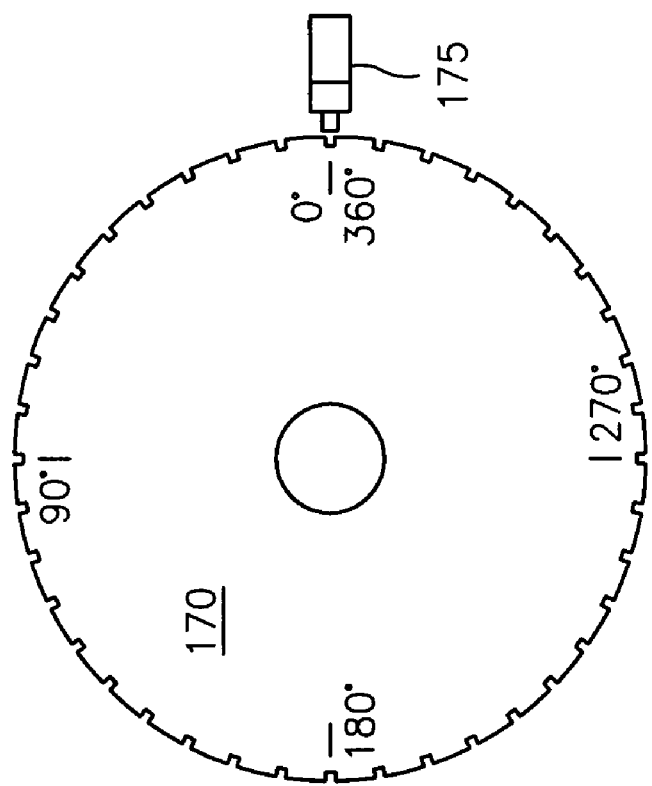
FIG. 7 is an exemplary top view of the frequency wheel.

The frequency wheel 170 embodiment shown in FIG. 7 has 36 slots in its outer periphery. The wheel 170 may be similarly coupled to the shaft of the rotary valve 140, the shaft 410 of the rotary valve 140 drive motor 155, or located on a geared or non-geared auxiliary shaft positioned away from the rotary valve 140 (not shown).

Similar to the profile wheel 160 circuit, the frequency wheel 170 creates a change in magnetic flux. Located adjacent and in proximity to the edge of the frequency wheel 170 is the non-contact sensor 175. The sensor 175 may be a magnetic field sensor such as a Hall-effect device. Unlike the profile disk 160, the frequency wheel 170 is divided into thirty six slots 180 each having an angular displacement of ten degrees. The rotation of the frequency wheel 170 creates an analog signal output $V_{sensor2\_out}$ corresponding to each ten degrees of rotary valve 140 angular displacement. The frequency wheel 170 analog output signal $V_{sensor2\_out}$ combined with the profile disk 160 allows for accurate engine timing input for fuel and ignition timing and control.

Figure 8A:
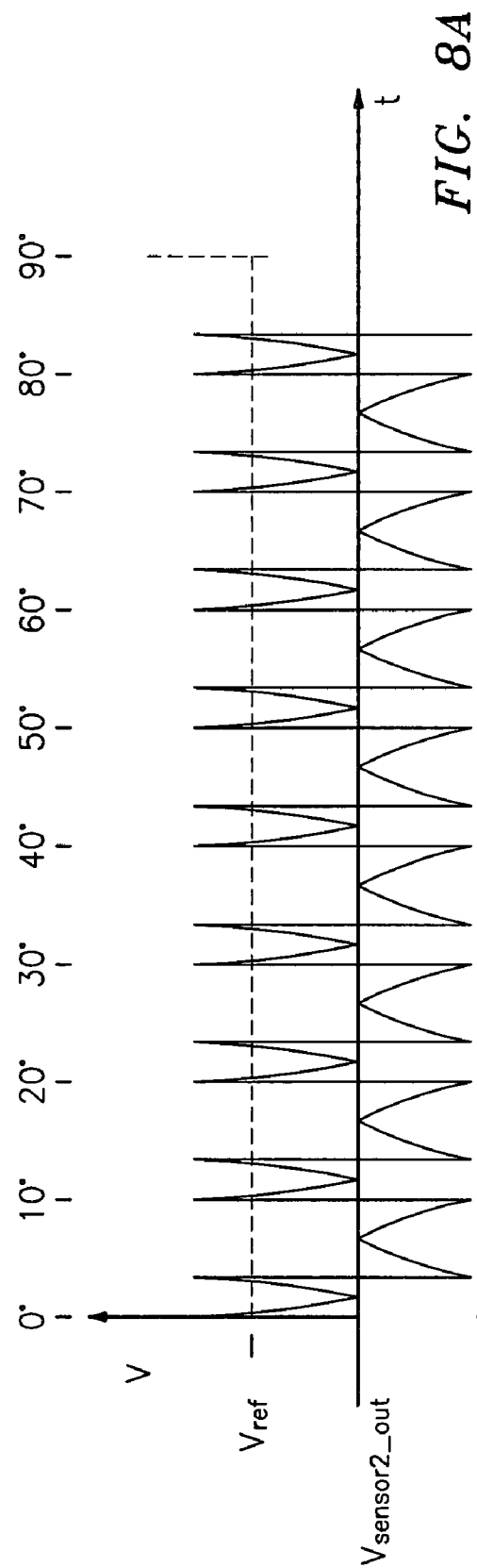
FIG. 8A is an exemplary plot of the frequency wheel position sensor output voltage $V_{sensor2\_out}$ over time.

The change in magnetic flux produces a signal $V_{sensor2\_out}$ that increases in amplitude as the angular velocity of the frequency wheel 170 increases. The sensor 175 output, $V_{sensor2\_out}$ is shown over time in FIG. 8A. The signal $V_{sensor2\_out}$ is coupled to an operational amplifier IC3 such as a Motorola MC4741C1 which is configured as a voltage comparator with a reference voltage of $V_{ref}$=0.354 Vdc. The comparator output $V_{IC3\_out}$ is clamped with a diode $D_2$.

The comparator provides an output voltage $V_{IC3\_out}$ that equals 0 Vdc when the input voltage is greater than the predefined reference voltage $V_{ref}$.

Figure 8B:
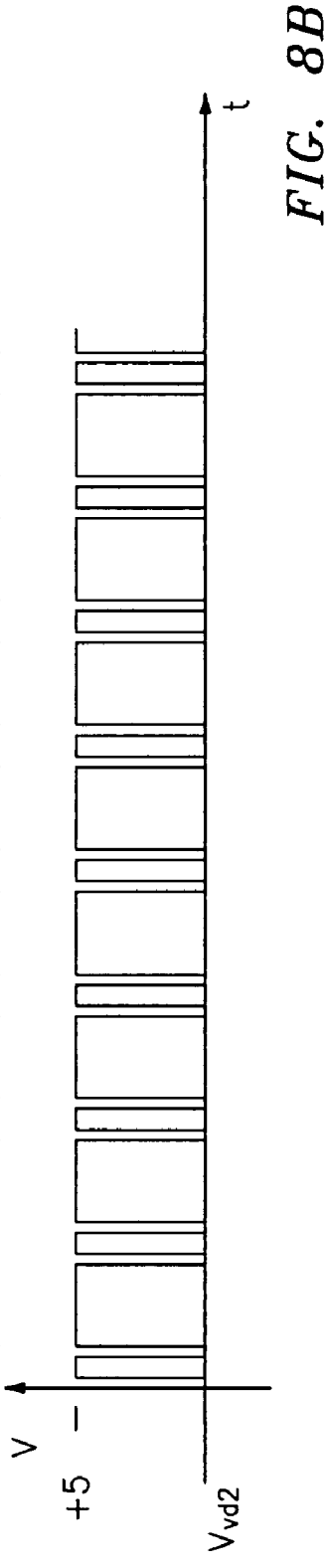
FIG. 8B is an exemplary plot of the frequency wheel voltage divider output voltage $V_{vd2}$ over time.

When the input voltage $V_{sensor2\_out}$ is less than the reference voltage $V_{ref}$, the comparator outputs a saturation voltage $V_{IC3\_out}=+V_{sat}$. The operational amplifier is sourced with ±15 Vdc causing the saturation voltage $+V_{sat}$ to therefore be +15 Vdc. The comparator output waveform is reduced to +5 Vdc using a voltage divider comprised of resistors $R_4$ and $R_5$, $$V_{vd2} = \frac{V_{IC3\_out}(R_5 \| R_{load2})}{(R_4 + R_5 \| R_{load2})}, \quad (2)$$

where $V_{vd2}$ is the voltage measured across $R_5$ and $R_{load2}$. $R_{load2}$ is the input impedance of a coupled load. The values for $R_4$ and $R_5$ can be set at 35.6 kΩ and 17.8 kΩ respectively. The voltage divider output $V_{vd2}$ is shown over time in FIG. 8B.

$V_{vd2}$ may be coupled to a pulse detonation engine control system.

Electric power for the rotary valve 140 drive motor 155, engine management system, spark ignition system, and other electrical loads can be derived from several sources including batteries, inlet air or gas ac alternators/DC generators, electric turbo generators, or a combination of these sources. Inlet air or gas generator systems consist of a turbine rotor, placed in either the air or gas generator flow, in order to drive a small electric generator.

The choice of ignition method is dependent on engine size and on the characteristics of the fuel used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A pulse detonation engine having an engine timing input system coupled to a rotary valve to control an inlet flow, the engine timing input system comprising:
a profile disk having a center and a circumferential edge;
said profile disk center coupled to a rotating member of the engine wherein one revolution of said rotating member represents one engine cycle; and
a profile disk sensor positioned in proximity to said circumferential edge, wherein said profile disk sensor translates a sensed position of said circumferential edge into a profile disk signal for output, wherein said profile disk circumferential edge is not at a constant radius from said center.

2. The system according to claim 1 wherein said profile disk circumferential edge further comprises at least one step.

3. The system according to claim 2 wherein said step is indexed with a predetermined position of the engine.

4. The system according to claim 3 further comprising a profile disk signal conditioner coupled to said profile disk sensor output wherein said signal conditioner processes said profile disk sensor signal into a predefined pulse train.

5. An engine timing input system comprising:
a profile disk having a center and a circumferential edge;
said profile disk center coupled to a rotating member of the engine wherein one revolution of said rotating member represents one engine cycle;
a profile disk sensor positioned in proximity to said circumferential edge, wherein said profile disk sensor translates a position of said circumferential edge into a profile disk signal for output and a profile disk signal conditioner coupled to said profile disk sensor output wherein said signal conditioner processes said profile disk sensor signal into a predefined pulse train, wherein said profile disk signal conditioner comprises:
voltage comparator coupled to said profile disk sensor output wherein said voltage comparator shapes said profile disk sensor output into a voltage comparator pulse train for output; and
one shot coupled to said voltage comparator output wherein said one shot modifies said voltage comparator pulse train pulse width.

6. The system of claim 5 further comprising:
a frequency wheel having a center and a circumferential edge having a plurality of slots;
said frequency wheel center coupled to said rotating member of the engine; and
a frequency wheel sensor positioned in proximity to said frequency wheel edge, wherein said sensor translates said circumferential edge into a frequency wheel signal for output.

7. The system of claim 6 further comprising a frequency wheel signal conditioner coupled to said frequency wheel sensor output wherein said frequency wheel signal conditioner processes said sensor signal into a predefined frequency wheel pulse train.

8. The system according to claim 7 wherein said frequency wheel signal conditioner comprises a second voltage comparator coupled to said frequency wheel sensor output wherein said second voltage comparator shapes said frequency wheel output into said predefined frequency wheel pulse train for output.

9. The system according to claim 8 wherein said at least one step of said profile disk is indexed with one slot of said frequency wheel.

10. The system of claim 9 wherein said slots in said frequency wheel correspond to angular degrees of engine position.

11. The system according to claim 10 wherein said profile disk pulse train in conjunction with said frequency wheel pulse train determines engine timing position.

12. The system according to claim 10 wherein said profile disk sensor is a Hall-effect device.

13. The system according to claim 12 wherein said frequency wheel sensor is a Hall-effect device.

14. An engine timing input system comprising:
a profile disk having a center and a circumferential edge;
said profile disk center coupled to a rotating member of the engine wherein one revolution of said rotating member represents one engine cycle;
a profile disk sensor positioned in proximity to said profile disk circumferential edge, wherein said profile disk sensor translates a position of said profile disk circumferential edge into a profile disk signal for output;
a frequency wheel having a center and a circumferential edge;
said frequency wheel center coupled to said rotating member of the engine; and
a frequency wheel sensor positioned in proximity to said frequency wheel circumferential edge, wherein said frequency wheel sensor translates a position of said frequency wheel circumferential edge into a frequency wheel signal for output.

15. The system of claim 14 further comprising a profile disk signal conditioner coupled to said profile disk sensor output wherein said signal conditioner processes said sensor signal into a predefined pulse train and a frequency wheel signal conditioner coupled to said frequency wheel sensor output wherein said frequency wheel signal conditioner processes said sensor signal into a predefined pulse train.

16. The system according to claim 15 wherein said profile disk circumferential edge further comprises least one step.

17. The system according to claim 16 wherein said profile disk signal conditioner further comprises:
a voltage comparator coupled to said profile disk sensor output wherein said voltage comparator shapes said profile disk sensor output into a voltage comparator pulse train; and
a one shot coupled to an output of said voltage comparator wherein said one shot modifies said voltage comparator pulse train pulse width.

18. The system of claim 17 further comprising a frequency wheel signal conditioner coupled to said frequency wheel sensor output wherein said frequency wheel signal conditioner processes said sensor signal into a predefined pulse train.

19. The system of claim 18 wherein said frequency wheel circumferential edge has a plurality of slots.

20. The system according to claim 19 wherein said at least one step of said profile disk is indexed with one slot of said frequency wheel.

21. The system of claim 20 wherein said slots in said frequency wheel correspond to angular degrees of engine position.

22. The system of claim 1 further comprising:
a frequency wheel having a center and a circumferential edge having a plurality of slots;
said frequency wheel center coupled to said rotating member of the engine; and
a frequency wheel sensor positioned in proximity to said frequency wheel edge, wherein said sensor translates said circumferential edge into a frequency wheel signal for output.

23. The system of claim 1, wherein:
the rotating member comprises said rotary valve; and
the profile disk is coupled to a slot of the rotary valve.

* * * * *